(12) United States Patent
Chang et al.

(10) Patent No.: US 11,752,730 B2
(45) Date of Patent: Sep. 12, 2023

(54) BENDABLE GLASS STACK ASSEMBLIES AND METHODS OF MAKING THE SAME

(71) Applicant: CORNING INCORPORATED, Corning, NY (US)

(72) Inventors: Theresa Chang, Painted Post, NY (US); Timothy Michael Gross, Corning, NY (US); Guangli Hu, Berkeley Heights, NJ (US); Nicholas James Smith, State College, PA (US); James Ernest Webb, Corning, NY (US)

(73) Assignee: Corning Incorporated, Corning, NY (US)

( * ) Notice: Subject to any disclaimer, the term of this patent is extended or adjusted under 35 U.S.C. 154(b) by 636 days.

(21) Appl. No.: 15/504,897

(22) PCT Filed: Aug. 11, 2015

(86) PCT No.: PCT/US2015/044596
§ 371 (c)(1),
(2) Date: Feb. 17, 2017

(87) PCT Pub. No.: WO2016/028542
PCT Pub. Date: Feb. 25, 2016

(65) Prior Publication Data
US 2017/0274627 A1 Sep. 28, 2017

Related U.S. Application Data

(60) Provisional application No. 62/039,120, filed on Aug. 19, 2014.

(51) Int. Cl.
*B32B 17/06* (2006.01)
*B32B 27/36* (2006.01)
(Continued)

(52) U.S. Cl.
CPC ............... *B32B 7/12* (2013.01); *B32B 7/022* (2019.01); *B32B 27/36* (2013.01); *B32B 37/14* (2013.01);
(Continued)

(58) Field of Classification Search
CPC ......... B32B 17/064; B32B 37/14; B32B 7/02; B32B 7/12
See application file for complete search history.

(56) References Cited

U.S. PATENT DOCUMENTS

| 6,287,674 B1 | 9/2001 | Verlinden et al. |
| 8,486,537 B2 | 7/2013 | Whitcomb et al. |

(Continued)

FOREIGN PATENT DOCUMENTS

| CN | 102782772 A | 11/2012 |
| CN | 103474580 A | 12/2013 |

(Continued)

OTHER PUBLICATIONS

Matthewson et al, "Strength Measurement of Optical Fibers by Bending." J Am Ceram Soc 69, 815-821. 1986.
(Continued)

*Primary Examiner* — Laura A Auer
(74) *Attorney, Agent, or Firm* — Jeffrey A. Schmidt (57) ABSTRACT

A stack assembly is provided that includes a glass layer having a thickness, a first and second primary surface and a compressive stress region extending from the second primary surface to a first depth; and a second layer coupled to the second primary surface. The glass layer is characterized by: an absence of failure when the layer is held at a bend radius from about 3 to 20 mm, a puncture resistance of greater than about 1.5 kgf when the second primary surface is supported by (i) an ~25 μm thick PSA and (ii) an ~50 μm thick PET layer, and the first primary surface is loaded with
(Continued)

a stainless steel pin having a flat bottom with a 200 μm diameter, a pencil hardness of at least 8H, and a neutral axis within the glass layer located between the second primary surface and half of the first thickness.

18 Claims, 5 Drawing Sheets

(51) Int. Cl.
  *B32B 7/02* (2019.01)
  *B32B 7/12* (2006.01)
  *B32B 37/14* (2006.01)
  *B32B 7/022* (2019.01)
(52) U.S. Cl.
  CPC ... *B32B 2307/536* (2013.01); *B32B 2309/105* (2013.01)

(56) References Cited

U.S. PATENT DOCUMENTS

| | | | |
|---|---|---|---|
| 9,321,679 B2 | 4/2016 | Chang et al. | |
| 9,431,630 B2 | 8/2016 | Huang et al. | |
| 2005/0228152 A1* | 10/2005 | Starry | C08F 216/1408 |
| | | | 526/247 |
| 2011/0165393 A1* | 7/2011 | Bayne | C03C 21/002 |
| | | | 428/215 |
| 2013/0196163 A1 | 8/2013 | Swanson | |
| 2014/0050911 A1 | 2/2014 | Mauro et al. | |
| 2014/0132132 A1 | 5/2014 | Chowdhury et al. | |
| 2015/0072125 A1 | 3/2015 | Murashige et al. | |
| 2015/0147538 A1* | 5/2015 | Ishimaru | C03C 21/002 |
| | | | 428/192 |
| 2015/0210588 A1 | 7/2015 | Chang et al. | |
| 2015/0258750 A1 | 9/2015 | Kang et al. | |
| 2015/0266272 A1 | 9/2015 | Lee et al. | |
| 2016/0002103 A1* | 1/2016 | Wang | C03C 15/00 |
| | | | 428/141 |

FOREIGN PATENT DOCUMENTS

| | | |
|---|---|---|
| CN | 103561952 A | 2/2014 |
| JP | 2013-521615 A | 6/2013 |
| JP | 2013-212633 A | 10/2013 |
| JP | 2016-539067 A | 12/2016 |
| KR | 10-2012-0016906 A | 2/2012 |
| KR | 2012061606 A | 6/2012 |
| KR | 2014007252 A | 1/2014 |
| TW | 201412522 A | 4/2014 |
| WO | 2011/109114 A2 | 9/2011 |
| WO | 2012/166343 A2 | 12/2012 |
| WO | 2014/035942 A1 | 3/2014 |

OTHER PUBLICATIONS

International Search Report and Written Opinion PCT/US2015/044596 dated Dec. 9, 2015.
Machine Translation of JP2017509638 dated Jul. 3, 2019, Japan Patent Office, 3 Pgs.
English translation of Korean Publication No. 2012-0016906, published Jun. 13, 2012, 24 pgs.

* cited by examiner

BENDABLE GLASS STACK ASSEMBLIES AND METHODS OF MAKING THE SAME

CROSS-REFERENCE TO RELATED APPLICATIONS

This application claims the benefit of priority under 35 U.S.C. § 371 of International Patent Application Serial No. PCT/US15/44596, filed on Aug. 11, 2015, which in turn, claims the benefit of priority of U.S. Provisional Patent Application Ser. No. 62/039,120 filed on Aug. 19, 2014, the contents of each of which are relied upon and incorporated herein by reference in their entireties.

TECHNICAL FIELD

The disclosure generally relates to glass stack assemblies, elements and layers and various methods for making them. More particularly, the disclosure relates to stacking-optimized, bendable and puncture-resistant versions of these components and methods for making them for applications including, but not limited to, thin film transistor (TFT) backplane, organic light emitting diode (OLED) devices, conformable display stacks, large curved displays, and backsplashes.

BACKGROUND

Flexible versions of products and components that are traditionally rigid in nature are being conceptualized for new applications. For example, flexible electronic devices can provide thin, lightweight and flexible properties that offer opportunities for new applications, for example curved displays and wearable devices. Many of these flexible electronic devices require flexible substrates for holding and mounting the electronic components of these devices. Metal foils have some advantages including thermal stability and chemical resistance, but suffer from high cost and a lack of optical transparency. Polymeric foils have some advantages including resistance to fatigue failure, but suffer from marginal optical transparency, lack of thermal stability and limited hermeticity.

Some of these electronic devices also can make use of flexible displays. Optical transparency and thermal stability are often important properties for flexible display applications. In addition, flexible displays should have high fatigue and puncture resistance, including resistance to failure at small bend radii, particularly for flexible displays that have touch screen functionality and/or can be folded.

Conventional flexible glass materials offer many of the needed properties for flexible substrate and/or display applications. For example, ultra-thin glass (<200 μm) is expected to have a role to play in these applications given its transparency, chemical stability and resistance to scratching relative to metal and polymeric alternatives. However, efforts to harness glass materials for these flexible applications have been largely unsuccessful to date. Generally, glass substrates can be manufactured to very low thickness levels (<25 μm) to achieve smaller and smaller bend radii. These "thin" glass substrates suffer from limited puncture resistance. At the same time, thicker glass substrates (>150 μm) can be fabricated with better puncture resistance, but these substrates lack suitable fatigue resistance and mechanical reliability upon bending.

Under bending conditions associated with foldable display applications, for example, such thin glass substrates experience maximum tensile bending stresses at their primary surfaces opposite those on the display-side of the device (e.g., the convex side during bending). In particular, the glass substrates in such foldable displays are intended to be bent such that the display-side of the substrates are folded onto each other (e.g., as a wallet), wherein their inner surfaces (i.e., surfaces opposite from the display-side surfaces) are placed in tension. Such tensile stresses increase as a function of decreasing bend radius or radius of curvature. At these primary surfaces, flaws and other defects may be present. As a result, the bending forces applied to such thin glass substrates from their application environment make these glass substrates particularly prone to tensile-related and fatigue-related failure, potentially with crack initiation at such flaws and defects.

Thus, there is a need for glass materials, glass stack assemblies, components and other related assemblies for reliable use in flexible substrate and/or display applications and functions, particularly for flexible electronic device applications. Further, there is a need for materials design and processing approaches to develop such flexible glass assemblies and components that are mindful of the stresses developed within their application environment.

SUMMARY

According to one aspect, a stack assembly is provided that includes a glass element having a first thickness from about 25 μm to about 125 μm, and a first and a second primary surface. The glass element further includes (a) a first glass layer having a first and second primary surface, and (b) a compressive stress region extending from the second primary surface of the glass layer to a first depth in the glass layer, the region defined by a compressive stress of at least about 100 MPa at the second primary surface of the layer. The stack assembly also includes a second layer coupled to the second primary surface of the glass layer having a second thickness. In certain aspects, the second layer has an elastic modulus that is lower than the elastic modulus of the glass layer. The glass element is characterized by: (a) an absence of failure when the element is held at a bend radius from about 3 mm to about 20 mm for at least 60 minutes at about 25° C. and about 50% relative humidity, (b) a puncture resistance of greater than about 1.5 kgf when the second primary surface of the element is supported by (i) an approximately 25 μm thick pressure-sensitive adhesive (PSA) having an elastic modulus of less than about 1 GPa and (ii) an approximately 50 μm thick polyethylene terephthalate layer having an elastic modulus of less than about 10 GPa, and the first primary surface of the element is loaded with a stainless steel pin having a flat bottom with a 200 μm diameter, (c) a pencil hardness of greater than or equal to 8H, and (d) a neutral axis within the glass layer that is located between the second primary surface and half of the first thickness.

In some embodiments, the glass element can further comprise one or more additional glass layers and one or more respective compressive stress regions disposed beneath the first glass layer. For example, the glass element can comprise two, three, four or more additional glass layers with corresponding additional compressive stress regions beneath the first glass layer.

According to an aspect, a glass article is provided that includes: a glass layer having a first thickness from about 25 μm to about 125 μm. The layer further includes (a) a first primary surface, (b) a second primary surface, and (c) a compressive stress region extending from the second primary surface of the glass layer to a first depth in the glass layer, the region defined by a compressive stress of at least about 100 MPa at the second primary surface of the layer. The glass article also includes a second layer coupled to the second primary surface of the glass layer having a second thickness. According to some aspects, the second layer has an elastic modulus that is lower than the elastic modulus of the glass layer. The glass layer is characterized by: (a) an absence of failure when the layer is held at a bend radius from about 3 mm to about 20 mm for at least 60 minutes at about 25° C. and about 50% relative humidity, (b) a puncture resistance of greater than about 1.5 kgf when the second primary surface of the layer is supported by (i) an approximately 25 µm thick pressure-sensitive adhesive having an elastic modulus of less than about 1 GPa and (ii) an approximately 50 µm thick polyethylene terephthalate layer having an elastic modulus of less than about 10 GPa, and the first primary surface of the layer is loaded with a stainless steel pin having a flat bottom with a 200 µm diameter, (c) a pencil hardness of greater than or equal to 8H, and (d) a neutral axis within the glass layer that is located between the second primary surface and half of the first thickness.

In some embodiments, the glass layer comprises an alkali-free or alkali-containing aluminosilicate, borosilicate, boroaluminosilicate, or silicate glass composition. The thickness of the glass layer can also range from about 50 µm to about 100 µm. The thickness of the glass layer can range from 60 µm to about 80 µm, according to some aspects.

In some embodiments, the bend radius of the glass element or the glass layer can be from about 3 mm to about 20 mm. In other aspects, the bend radius can be from about 3 mm to about 10 mm.

According to certain aspects, the glass element or glass layer can include a third layer with a low coefficient of friction disposed on the first primary surface of the glass element or layer (e.g., on the display-side of the stack assembly). According to certain aspects, the third layer can be a coating comprising a fluorocarbon material selected from the group consisting of thermoplastics and amorphous fluorocarbons. The third layer can also be a coating comprising one or more of the group consisting of a silicone, a wax, a polyethylene, a hot-end, a parylene, and a diamond-like coating preparation. Further, the third layer can be a coating comprising a material selected from the group consisting of zinc oxide, molybdenum disulfide, tungsten disulfide, hexagonal boron nitride, and aluminum magnesium boride. According to some embodiments, the third layer can be a coating comprising an additive selected from the group consisting of zinc oxide, molybdenum disulfide, tungsten disulfide, hexagonal boron nitride, and aluminum magnesium boride.

In some implementations, the second layer can comprise, or consist solely, of a composite of polyethylene terephthalate (PET) and optically clear adhesive (OCA), the adhesive coupled to the second primary surface of the glass layer or element. The second layer may also comprise, or consist solely, of a composite of polymethyl methacrylate (PMMA) and OCA, the adhesive coupled to the second primary surface of the glass layer or element. Other materials, material combinations and/or structures can be employed as the second layer structure having a lower elastic modulus relative to the glass layer or element, depending on the particular application for the stack assembly. In certain implementations, the thicknesses and elastic moduli of the glass element or layer, along with those of the second layer, are configured to shift the neutral axis within the glass layer or element toward the second primary surface of the glass layer or element.

In some aspects, the compressive stress in the compressive stress region at the second primary surface is from about 300 MPa to 1000 MPa. The compressive stress region can also include a maximum flaw size of 5 µm or less at the second primary surface of the glass layer. In certain cases, the compressive stress region comprises a maximum flaw size of 2.5 µm or less, or even as low as 0.4 µm or less. In certain implementations, a second compressive stress region can also be incorporated at the first primary surface. Additional compressive regions can also be developed at one or more edges of the glass layer or element. These additional compressive stress regions can provide additional benefits in mitigating or eliminating stress-induced cracking and propagation associated with surface flaws introduced into the glass at other locations where application-oriented tensile stresses are not necessarily at a maximum, including on the display-side of the device.

In other aspects, the compressive stress region comprises a plurality of ion-exchangeable metal ions and a plurality of ion-exchanged metal ions, the ion-exchanged metal ions selected so as to produce compressive stress. In some aspects, the ion-exchanged metal ions have an atomic radius larger than the atomic radius of the ion-exchangeable metal ions. According to another aspect, the glass layer can further comprise a core region, and a first and a second clad region disposed on the core region, and further wherein the coefficient of thermal expansion for the core region is greater than the coefficient of thermal expansion for the clad regions.

According to a further aspect, a method of making a stack assembly is provided that includes the steps: forming a first glass layer having a first and a second primary surface, a compressive stress region extending from the second primary surface of the glass layer to a first depth in the glass layer, and a final thickness, wherein the region is defined by a compressive stress of at least about 100 MPa at the second primary surface of the layer; and forming a second layer with a second thickness that is coupled to the second primary surface of the first glass layer. In certain aspects, the second layer possesses an elastic modulus that is lower than the elastic modulus of the glass layer. The method also includes a step for forming a glass element having a thickness from about 25 µm to about 125 µm, the element further comprising a first and a second primary surface, and the first glass layer. The glass element is characterized by: (a) an absence of failure when the element is held at a bend radius from about 3 mm to about 20 mm for at least 60 minutes at about 25° C. and about 50% relative humidity, (b) a puncture resistance of greater than about 1.5 kgf when the second primary surface of the element is supported by (i) an approximately 25 µm thick pressure-sensitive adhesive having an elastic modulus of less than about 1 GPa and (ii) an approximately 50 µm thick polyethylene terephthalate layer having an elastic modulus of less than about 10 GPa, and the first primary surface of the element is loaded with a stainless steel pin having a flat bottom with a 200 µm diameter, (c) a pencil hardness of greater than or equal to 8H, and (d) a neutral axis within the glass layer that is located between the second primary surface and half of the first thickness.

In some embodiments of the method, the step of forming the first glass layer can comprise a forming process selected from the group consisting of fusion, slot drawing, rolling, redrawing and float processes, the forming process further configured to form the glass layer to the final thickness. Other forming processes can be employed depending on the final shape factor for the glass layer and/or intermediate dimensions of a glass precursor used for the final glass layer.

The forming process can also include a material removal process configured to remove material from the glass layer to reach the final thickness.

According to some aspects of the method, the step of forming a compressive stress region extending from the second primary surface of the glass layer to a first depth in the glass layer comprises: providing a strengthening bath comprising a plurality of ion-exchanging metal ions having an atomic radius larger in size than the atomic radius of a plurality ion-exchangeable metal ions contained in the glass layer; and submersing the glass layer in the strengthening bath to exchange a portion of the plurality of ion-exchangeable metal ions in the glass layer with a portion of the plurality of the ion-exchanging metal ions in the strengthening bath to form a compressive stress region extending from the second primary surface to the first depth in the glass layer. In certain cases, the submersing step comprises submersing the glass layer in the strengthening bath at about 400° C. to about 450° C. for about 15 minutes to about 180 minutes.

In certain embodiments, the method can also include a step of removing about 1 µm to about 5 µm from the final thickness of the glass layer at the second primary surface after the compressive stress region is created. The removing step can be conducted such that the compressive stress region comprises a maximum flaw size of 5 µm or less at the second primary surface of the glass layer. The removing step can also be conducted such that the compressive stress region comprises a maximum flaw size of 2.5 µm or less, or even as low as 0.4 µm or less, at the second primary surface of the glass layer.

Additional features and advantages will be set forth in the detailed description which follows, and in part will be readily apparent to those skilled in the art from that description or recognized by practicing the embodiments as described herein, including the detailed description which follows, the claims, as well as the appended drawings. The various aspects may be used in any and all suitable combinations, for example:

According to a first aspect, there is provided a stack assembly, comprising:
a glass element having a first thickness from about 25 µm to about 125 µm, and a first and a second primary surface, the glass element further comprising:
a first glass layer having a first and second primary surface, and
(b) a compressive stress region extending from the second primary surface of the glass layer to a first depth in the glass layer, the region defined by a compressive stress of at least about 100 MPa at the second primary surface of the layer; and
a second layer coupled to the second primary surface of the glass layer having a second thickness,
wherein the glass element is characterized by:
(a) an absence of failure when the element is held at a bend radius from about 3 mm to about 20 mm for at least 60 minutes at about 25° C. and about 50% relative humidity,
(b) a puncture resistance of greater than about 1.5 kgf when the second primary surface of the element is supported by (i) an approximately 25 µm thick pressure-sensitive adhesive having an elastic modulus of less than about 1 GPa and (ii) an approximately 50 µm thick polyethylene terephthalate layer having an elastic modulus of less than about 10 GPa, and the first primary surface of the element is loaded with a stainless steel pin having a flat bottom with a 200 µm diameter,
(c) a pencil hardness of greater than or equal to 8H, and
(d) a neutral axis within the glass layer that is located between the second primary surface and half of the first thickness.

According to a second aspect, there is provided the assembly of aspect 1, wherein the first glass layer comprises an alkali-free or alkali-containing aluminosilicate, borosilicate, boroaluminosilicate, or silicate glass composition.

According to a third aspect, there is provided the assembly of aspect 1 or aspect 2, wherein the thickness of the element is from about 50 µm to about 100 µm.

According to a fourth aspect, there is provided the assembly of any one of aspects 1 to 3, wherein the bend radius of the element is from about 3 mm to about 10 mm.

According to a fifth aspect, there is provided the assembly of any one of aspects 1 to 4, wherein the compressive stress at the second primary surface of the glass layer is from about 300 MPa to 1000 MPa.

According to a sixth aspect, there is provided the assembly of any one of aspects 1 to 5, wherein the first depth is set at approximately one third of the thickness of the glass layer or less from the second primary surface of the glass layer.

According to a seventh aspect, there is provided the assembly of any one of aspects 1 to 6, wherein the compressive stress region comprises a plurality of ion-exchangeable metal ions and a plurality of ion-exchanged metal ions, the ion-exchanged metal ions having an atomic radius larger than the atomic radius of the ion-exchangeable metal ions.

According to an eighth aspect, there is provided the assembly of any one of aspects 1 to 7, wherein the glass layer further comprises an edge, and the glass element further comprises an edge compressive stress region extending from the edge to an edge depth in the glass layer, the edge compressive stress region defined by a compressive stress of at least about 100 MPa at the edge.

According to a ninth aspect, there is provided the assembly of any one of aspects 1 to 8, wherein the second layer comprises a composite of polyethylene terephthalate (PET) and optically clear adhesive (OCA), the adhesive coupled to the second primary surface of the glass layer.

According to a tenth aspect, there is provided the assembly of any one of aspects 1 to 9, wherein the second layer comprises a composite of polymethyl methacrylate (PMMA) and optically clear adhesive (OCA), the adhesive coupled to the second primary surface of the glass layer.

According to an eleventh aspect, there is provided the assembly of aspect 9, wherein the thicknesses and elastic moduli of the PET, OCA and the glass layer are configured to shift the neutral axis substantially toward the second primary surface of the glass layer.

According to a twelfth aspect, there is provided the assembly of aspect 10, wherein the thicknesses and elastic moduli of the PET, OCA and the glass layer are configured to shift the neutral axis substantially toward the second primary surface of the glass layer.

According to a thirteenth aspect, there is provided a glass article, comprising:
a glass layer having a first thickness from about 25 µm to about 125 µm, the layer further comprising:
(a) a first primary surface,
(b) a second primary surface, and
(c) a compressive stress region extending from the second primary surface of the glass layer to a first depth in the glass layer, the region defined by a compressive stress of at least about 100 MPa at the second primary surface of the layer; and
a second layer coupled to the second primary surface of the glass layer having a second thickness, wherein the glass layer is characterized by:

(a) an absence of failure when the layer is held at a bend radius from about 3 mm to about 20 mm for at least 60 minutes at about 25° C. and about 50% relative humidity, (b) a puncture resistance of greater than about 1.5 kgf when the second primary surface of the layer is supported by (i) an approximately 25 μm thick pressure-sensitive adhesive having an elastic modulus of less than about 1 GPa and (ii) an approximately 50 μm thick polyethylene terephthalate layer having an elastic modulus of less than about 10 GPa, and the first primary surface of the layer is loaded with a stainless steel pin having a flat bottom with a 200 μm diameter, (c) a pencil hardness of greater than or equal to 8H, and (d) a neutral axis within the glass layer that is located between the second primary surface and half of the first thickness.

According to a fourteenth aspect, there is provided the article of aspect 13, wherein the glass layer comprises an alkali-free or alkali-containing aluminosilicate, borosilicate, boroaluminosilicate, or silicate glass composition.

According to a fifteenth aspect, there is provided the article of aspect 13 or aspect 14, wherein the thickness of the glass layer is from about 50 μm to about 100 μm.

According to a sixteenth aspect, there is provided the article of any one of aspects 13 to 15, wherein the bend radius of the glass layer is from about 3 mm to about 10 mm.

According to a seventeenth aspect, there is provided the article of any one of aspects 13 to 16, wherein the compressive stress at the second primary surface of the glass layer is from about 300 MPa to 1000 MPa.

According to an eighteenth aspect, there is provided the article of any one of aspects 13 to 17, wherein the first depth is set at approximately one third of the thickness of the glass layer or less from the second primary surface of the glass layer.

According to a nineteenth aspect, there is provided the article of any one of aspects 13 to 18, wherein the compressive stress region comprises a plurality of ion-exchangeable metal ions and a plurality of ion-exchanged metal ions, the ion-exchanged metal ions having an atomic radius larger than the atomic radius of the ion-exchangeable metal ions.

According to a twentieth aspect, there is provided the article of any one of aspects 13 to 19, wherein the glass layer further comprises an edge, and an edge compressive stress region extending from the edge to an edge depth in the glass layer, the edge compressive stress region defined by a compressive stress of at least about 100 MPa at the edge.

According to a twenty first aspect, there is provided the article of any one of aspects 13 to 20, wherein the second layer comprises a composite of polyethylene terephthalate (PET) and optically clear adhesive (OCA), the adhesive coupled to the second primary surface of the glass layer.

According to a twenty second aspect, there is provided the article of any one of aspects 13 to 20, wherein the second layer comprises a composite of polymethyl methacrylate (PMMA) and optically clear adhesive (OCA), the adhesive coupled to the second primary surface of the glass layer.

According to a twenty third aspect, there is provided the article of aspect 21, wherein the thicknesses and elastic moduli of the PET, OCA and the glass layer are configured to shift the neutral axis substantially toward the second primary surface of the glass layer.

According to a twenty fourth aspect, there is provided the article of aspect 22, wherein the thicknesses and elastic moduli of the PET, OCA and the glass layer are configured to shift the neutral axis substantially toward the second primary surface of the glass layer.

According to a twenty fifth aspect, there is provided a method of making a stack assembly, comprising the steps:

forming a first glass layer having a first and a second primary surface, a compressive stress region extending from the second primary surface of the glass layer to a first depth in the glass layer, and a final thickness, wherein the region is defined by a compressive stress of at least about 100 MPa at the second primary surface of the layer;

forming a second layer with a second thickness that is coupled to the second primary surface of the first glass layer; and forming a glass element having a thickness from about 25 μm to about 125 μm, the element further comprising a first and a second primary surface, and the first glass layer, wherein the glass element is characterized by:

(a) an absence of failure when the element is held at a bend radius from about 3 mm to about 20 mm for at least 60 minutes at about 25° C. and about 50% relative humidity, (b) a puncture resistance of greater than about 1.5 kgf when the second primary surface of the element is supported by (i) an approximately 25 μm thick pressure-sensitive adhesive having an elastic modulus of less than about 1 GPa and (ii) an approximately 50 μm thick polyethylene terephthalate layer having an elastic modulus of less than about 10 GPa, and the first primary surface of the element is loaded with a stainless steel pin having a flat bottom with a 200 μm diameter, (c) a pencil hardness of greater than or equal to 8H, and (d) a neutral axis within the glass layer that is located between the second primary surface and half of the first thickness.

According to a twenty sixth aspect, there is provided the method of aspect 25, further comprising the step:

optimizing the thickness and the elastic moduli of the first glass layer and the second layer to shift the neutral axis substantially toward the second primary surface of the glass layer.

According to a twenty seventy aspect, there is provided the method of aspect 26, wherein the second layer comprises a composite of polyethylene terephthalate (PET) and optically clear adhesive (OCA), the adhesive coupled to the second primary surface of the glass layer.

According to a twenty eighth aspect, there is provided the method of aspect 26, wherein the second layer comprises a composite of polymethyl methacrylate (PMMA) and optically clear adhesive (OCA), the adhesive coupled to the second primary surface of the glass layer.

According to a twenty ninth aspect, there is provided the assembly of any one of the aspects 1-12, wherein the second layer has an elastic modulus that is lower than the elastic modulus of the glass layer.

According to a thirtieth aspect, there is provided the article of any one of the aspects 13-24, wherein the second layer has an elastic modulus that is lower than the elastic modulus of the glass layer.

According to a thirty first aspect, there is provided the method of any one of the aspects 25-28, wherein the second layer has an elastic modulus that is lower than the elastic modulus of the glass layer.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments. Directional terms as used herein—for example, up, down, right, left, front, back, top, bottom—are made only with reference to the figures as drawn and are not intended to imply absolute orientation.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts. Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Among other features and benefits, the stack assemblies, glass elements and glass articles (and the methods of making them) of the present disclosure provide mechanical reliability (e.g., in static tension and fatigue or through an equivalent number of dynamic loading cycles) at small bend radii as well as high puncture resistance. The small bend radii and puncture resistance are beneficial when the stack assembly, glass element, and/or glass article, are used in a foldable display, for example, one wherein one part of the display is folded over on top of another portion of the display. For example, the stack assembly, glass element and/or glass article, may be used as one or more of: a cover on the user-facing portion of a foldable display, a location wherein puncture resistance is particularly important; a substrate, disposed internally within the device itself, on which electronic components are disposed; or elsewhere in a foldable display device. Alternatively, the stack assembly, glass element, and or glass article, may be used in a device not having a display, but one wherein a glass layer is used for its beneficial properties and is folded, in a similar manner as in a foldable display, to a tight bend radius. The puncture resistance is particularly beneficial when the stack assembly, glass element, and/or glass article, are used on the exterior of the device, wherein a user will interact with it.

Figure 2:
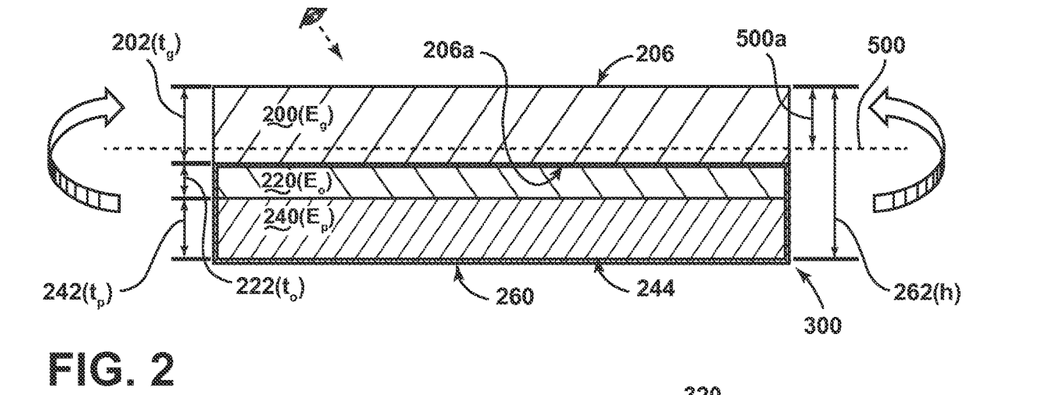
FIG. 2 is a schematic depicting a stack assembly having a first glass layer and a second layer coupled to the glass layer according to an aspect of the disclosure.

As an initial matter, the bendable glass stack assemblies and elements of this disclosure, and the processes for making them, are outlined in detail within U.S. Provisional Patent Application Nos. 61/932,924 and 61/974,732, filed on Jan. 29, 2014 and Apr. 3, 2014, respectively (collectively, the "Bendable Glass Applications"), and are hereby incorporated by reference in their entirety. For example, the stack assemblies 100, 100a, 100b, 100c, 100d and 100e and their corresponding descriptions in the Bendable Glass Applications can be employed or otherwise subsumed within the glass element 200 (also referred herein to as the "glass layer 200") of this disclosure, e.g., as depicted in FIG. 2 and described in further detail below.

Another benefit and feature of the stack assemblies according to some aspects of the disclosure is that they do not require compressive stress regions with a high magnitude of compressive stress to counteract the tensile stresses associated with the bending of the application. As a result, these stack assemblies can be strengthened to a lesser degree, providing a process-related cost savings over non-stacking-optimized, bendable glass assemblies.

Figure 1:
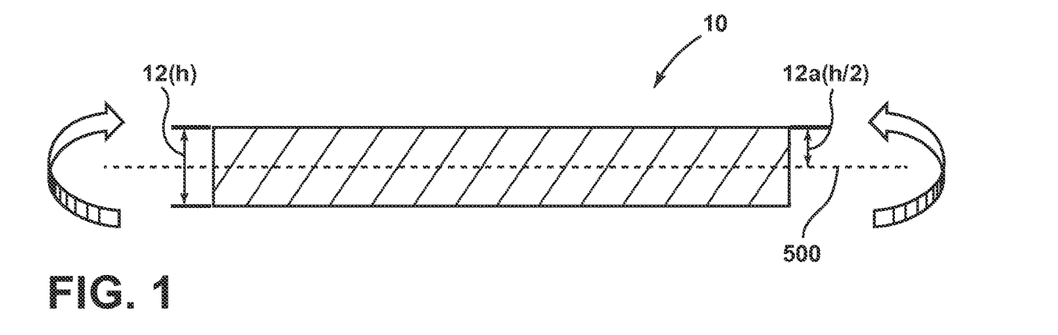
FIG. 1 is a schematic depicting a glass substrate upon bending with its neutral axis at about half of the thickness of the substrate.

Referring to FIG. 1, a schematic depicts an exposed glass substrate 10 (e.g., a glass substrate without any additional layers) having a thickness 12 (h) subjected to an upward bending condition (i.e., bending the substrate 10 into a "u" shape). As shown, the neutral axis 500 of the substrate 10 is at a distance 12a from one of the primary surfaces of the glass substrate. Distance 12a is about half of the thickness (h/2) of the glass layer. Accordingly, bending the glass substrate 10 in an upward motion generally places the upper surface of the substrate 10 in compression (e.g., at the inside of the "u" shape) and the lower surface in tension (e.g., at the bottom, outside, of the "u" shape).

The tensile stresses generated from the bending of the substrate 10 in FIG. 1 can be calculated or estimated from the following equation:

$$\sigma = E^*z/(1-v^2)^*R \tag{1}$$

where E is the elastic modulus of the substrate 10, R is the radius of the curvature of the substrate 10 during bending, v is Poisson's ratio for the substrate 10 and z is the distance to the neutral axis 500. As depicted in FIG. 1, z is the distance 12a of the substrate 10, located at about h/2. Accordingly, h/2 can be substituted in Equation (1) above to estimate the maximum tensile stress at the bottom surface of the substrate 10 (i.e., at the bottom, outside, of the "u"). It is also apparent that the maximum tensile stress will increase proportionally to increases in the thickness and/or elastic modulus of the glass substrate 10.

Referring to FIG. 2, a stack assembly 300 having a glass layer 200 and a second layer 260 is depicted according to an aspect of the disclosure. It should be understood that the glass layer 200 can be in the form of any of the stack assemblies identified as 100, 100a, 100b, 100c, 100d, and 100e in the Bendable Glass Applications, incorporated by reference herein. Stack assembly 300 offers the advantage of a neutral axis 500 that is shifted toward the primary surface of the glass layer 200 that is in tension upon an upward bending force (e.g., as in a "u" shape toward a viewer, wherein the viewer is depicted by the eyeball in FIG. 2). By shifting the neutral axis 500 toward the surface of the glass layer 200 in tension (e.g., primary surface 206a), less volume of the glass layer 200 is subjected to tensile stresses, and the maximum tensile stresses at the tensile surface of the glass layer (i.e., a primary surface 206a) are also reduced. It should also be understood that the magnitude of the shift of the neutral axis 500 can be optimized by controlling or otherwise adjusting the elastic moduli and thicknesses of the glass layer 200 and the second layer 260 (along with any sub-layers present within the second layer 260). Through this stacking optimization, the magnitude of the compressive stresses in a compressive stress region located at the tensile surface of the glass layer (e.g., as developed through an ion exchange process) can be reduced as lower amounts of compressive stresses are necessary to counteract or mitigate the tensile stresses generated during bending. For example, ion exchange processing can be conducted for shorter times and/or temperatures in such stack assemblies having a shifted neutral axis, thus providing a processing-related cost savings.

In FIG. 2, the stack assembly 300 having a thickness 262 (h) includes a glass layer 200 having an elastic modulus, $E_g$. The glass layer 200 is also characterized by a thickness 202, $t_g$, and first and second primary surfaces 206 and 206a, respectively. Further, the glass layer 200 possesses a neutral axis 500, located at a distance 500a from the first primary surface 206.

The stack assembly 300 also includes a second layer 260 having two sub-layers 220 and 240, each with an elastic modulus, $E_o$ and $E_p$, respectively. In some embodiments, the elastic modulus of the second layer 260 (and the sub-layers 220 and 240) is lower than $E_g$. Further, the sub-layers 220 and 240 are characterized by thicknesses, 222, $t_o$, and 242, $t_p$, respectively. As shown in FIG. 2, the second layer 260 possesses an exposed primary surface 244, and is coupled to the second primary surface 206a of the glass layer 200. In some implementations, it is particularly important to strongly bond or otherwise strongly couple the second layer 260 to the second primary surface 206a of the glass layer 200 to ensure that the neutral axis is shifted as intended during the application of bending forces to the stacking assembly 300.

In some implementations, a stack assembly 300 as depicted in FIG. 2 is provided that includes a glass element 200 (e.g., one or more glass layers) having a first thickness 202 from about 25 μm to about 125 μm, and a first and a second primary surface 206 and 206a, respectively. The glass element 200 further includes a compressive stress region extending from the second primary surface 206a of the glass element 200 to a first depth in the glass element 200, the region defined by a compressive stress of at least about 100 MPa at the second primary surface 206a of the element 200. In some aspects, the first depth in the glass element or layer 200 is set at approximately one third of the thickness 262 of the glass layer or element 200, as measured from the second primary surface 206a. The stack assembly 300 also includes a second layer 260 coupled to the second primary surface 206a of the glass element 200 having a second thickness (e.g., the sum of the thicknesses 222 ($t_o$) and 242 ($t_p$) when second layer 260 consists of sub-layers 220 and 240). In some embodiments, the second layer 260 has an elastic modulus (e.g., the average of $E_p$ and $E_o$) that is lower than the elastic modulus of the glass element 200.

In these implementations, the glass element 200 is characterized by: (a) an absence of failure when the element 200 is held at a bend radius from about 3 mm to about 20 mm for at least 60 minutes at about 25° C. and about 50% relative humidity, (b) a puncture resistance of greater than about 1.5 kgf when the second primary surface 206a of the element 200 is supported by (i) an approximately 25 μm thick pressure-sensitive adhesive having an elastic modulus of less than about 1 GPa and (ii) an approximately 50 μm thick polyethylene terephthalate layer having an elastic modulus of less than about 10 GPa, and the first primary surface 206 of the element 200 is loaded with a stainless steel pin having a flat bottom with a 200 μm diameter, (c) a pencil hardness of greater than or equal to 8H, and (d) a neutral axis 500 within the glass element 200 that is located between the second primary surface 206a and half of the first thickness 202 ($t_g$/2).

In some embodiments, the glass element or layer 200 can further comprise one or more additional glass layers and one or more respective compressive stress regions disposed beneath the first glass layer. For example, the glass element or layer 200 can comprise two, three, four or more additional glass layers with corresponding additional compressive stress regions beneath the first glass layer.

In some embodiments, the glass element or layer 200 comprises an alkali-free or alkali-containing aluminosilicate, borosilicate, boroaluminosilicate, or silicate glass composition. The thickness 202 ($t_g$) of the glass element or layer 200 can also range from about 50 μm to about 100 μm. The thickness 202 ($t_g$) of the glass layer 200 can range from 60 μm to about 80 μm, according to some aspects.

In some embodiments, the bend radius of the glass element or the glass layer 200 can be from about 3 mm to about 20 mm. In other aspects, the bend radius can be from about 3 mm to about 10 mm. It should be further understood that in one aspect of the disclosure, the bend radius of the glass element or layer 200 can be set based on the application intended for the stack assembly 300; and stacking optimization can then be conducted to optimize or tailor the thicknesses and elastic moduli of the glass layer 200 and the second layer 260 in view of the expected stress levels generated by such a bend radius.

According to certain aspects, the glass element or glass layer 200 can include a third layer with a low coefficient of friction disposed on the first primary surface 206 of the glass element or layer 200 (e.g., on the display-side of the stack assembly) as depicted in FIG. 2. According to certain aspects, the third layer can be a coating comprising a fluorocarbon material selected from the group consisting of thermoplastics and amorphous fluorocarbons. The third layer can also be a coating comprising one or more of the group consisting of a silicone, a wax, a polyethylene, a hot-end, a parylene, and a diamond-like coating preparation. Further, the third layer can be a coating comprising a material selected from the group consisting of zinc oxide, molybdenum disulfide, tungsten disulfide, hexagonal boron nitride, and aluminum magnesium boride. According to some embodiments, the third layer can be a coating comprising an additive selected from the group consisting of zinc oxide, molybdenum disulfide, tungsten disulfide, hexagonal boron nitride, and aluminum magnesium boride.

In some implementations, the second layer 260 (see FIG. 2) can comprise, or consist solely, of a composite of polyethylene terephthalate (PET) and optically clear adhesive (OCA), the adhesive coupled to the second primary surface 206a of the glass layer or element 200. The second layer 260 may also comprise, or consist solely, of a composite of polymethyl methacrylate (PMMA) and OCA, the adhesive coupled to the second primary surface 206a of the glass layer or element 200. Other materials, material combinations and/or structures can be employed as the second layer 260 structure that, in some embodiments, possess a lower elastic modulus than the elastic modulus of the glass layer or element 200, depending on the particular application for the stack assembly 300. In certain implementations, the thicknesses and elastic moduli of the glass element or layer 200, along with those of the second layer 260, are configured to shift the neutral axis 500 within the glass layer or element 200 toward the second primary surface 206*a* of the glass layer or element 200.

In some aspects, the compressive stress in the compressive stress region (not shown) at the second primary surface 206*a* is from about 300 MPa to 1000 MPa. The compressive stress region can also include a maximum flaw size of 5 μm or less at the second primary surface 206*a* of the glass layer. In certain cases, the compressive stress region comprises a maximum flaw size of 2.5 μm or less, or even as low as 0.4 μm or less. In certain implementations, a second compressive stress region can also be incorporated at the first primary surface 206, preferably from about 300 MPa to 1000 MPa. Additional compressive regions can also be developed at one or more edges of the glass layer or element, preferably defined by a compressive stress of at least 100 MPa at such edges. These additional compressive stress regions (e.g., at the first primary surface 206 and/or edges of the glass layer or element 200) can assist in mitigating or eliminating stress-induced cracking and propagation associated with surface flaws introduced into the glass at locations where the application-oriented tensile stresses are not necessarily at a maximum but flaw and defect populations are potentially prevalent in the stack assembly 300, including on the display-side of the device.

In other aspects, the compressive stress region comprises a plurality of ion-exchangeable metal ions and a plurality of ion-exchanged metal ions, the ion-exchanged metal ions selected so as to produce compressive stress. In some aspects, the ion-exchanged metal ions have an atomic radius larger than the atomic radius of the ion-exchangeable metal ions. According to another aspect, the glass layer 200 can further comprise a core region, and a first and a second clad region disposed on the core region, and further wherein the coefficient of thermal expansion for the core region is greater than the coefficient of thermal expansion for the clad regions.

Figure 3:
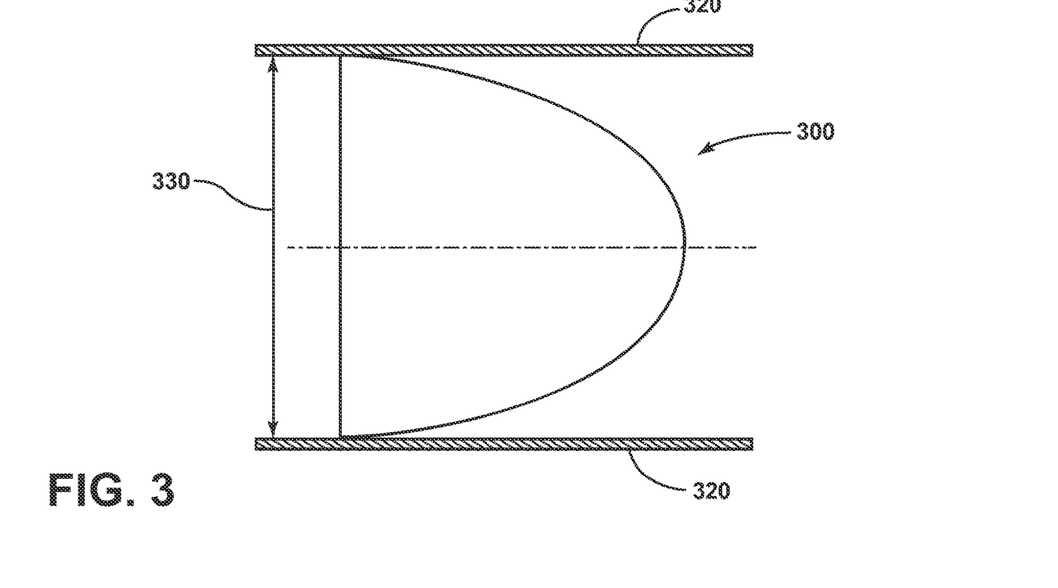
FIG. 3 is a schematic of a stack assembly having a first glass layer and a second layer subjected to a two-point bending testing configuration.

Referring to FIG. 3, a stack assembly 300 having a first glass layer (e.g., glass layer 200) and a second layer (e.g., second layer 260) is subjected to a two-point bending testing configuration. In FIG. 3, the bend plates 320 are moved toward each other to bend the stack assembly 300. The distance 330 between the bend plates 320 changes as the bend plates are moved toward one another, thus decreasing the bend radius associated with the stack assembly 300.

In the bend test configuration depicted in FIG. 3, the following equation can be employed to estimate the maximum bending stress of a glass sheet as a function of the distance between the bend plates:

$$\sigma_{max} = 1.198 E \frac{h}{D-h} \quad (2)$$

where E is the elastic modulus of the glass sheet, h is the thickness of the glass sheet and D is the distance between the bend plates. Equation (2) is referenced in Matthewson, M. J. et al., *Strength Measurement of Optical Fibers by Bending*, J. Am. Ceram. Soc., vol. 69, 815-21 (Matthewson). Matthewson is hereby incorporated by reference with particular regard to its disclosure related to Equation (2).

Given that the stack assembly 300 depicted in FIG. 3 is a composite stack of a glass layer 200 and a second layer 260, Equation (2) can be refined to account for the neutral axis shift outlined earlier in this disclosure in connection with FIG. 2. That is, for the stack assembly 300 depicted in FIG. 3, the maximum tensile stress on the glass layer 200 at the second primary surface 206*a* is given by the following equation:

$$\sigma_{max\text{-}ten}^{glass} = 2.396 E_g (t_g - x)/(D - 2(h-x)) \quad (3)$$

where x is the distance (i.e., distance 500*a*) from the first primary surface 206 to the neutral axis 500, h is the total thickness (i.e., thickness 262) of the stack assembly 300, $t_g$ is the thickness of the glass layer 200 (i.e., thickness 202), and $E_g$ is the elastic modulus of the glass layer 200.

With regard to the neutral axis 500, x, in Equation (3), it can be calculated based on the following equation:

$$x = \frac{E_g t_g^2/2 + E_o t_o(t_g + t_o/2) + E_p t_p(t_g + t_o + t_p/2)}{E_g t_g + E_o t_o + E_p t_p} \quad (4)$$

where the variables are as described in connection with the elements of the stack assembly 300 described earlier in connection with FIG. 2. By employing Equations (3) and (4) above, the elastic moduli and thicknesses of the glass layer 200 and second layer 260 (e.g., sub-layers 220 and 240) can be modified to assess their respective impact on the maximum tensile stress in the glass layer 200 of the stack assembly 300.

Figure 4:
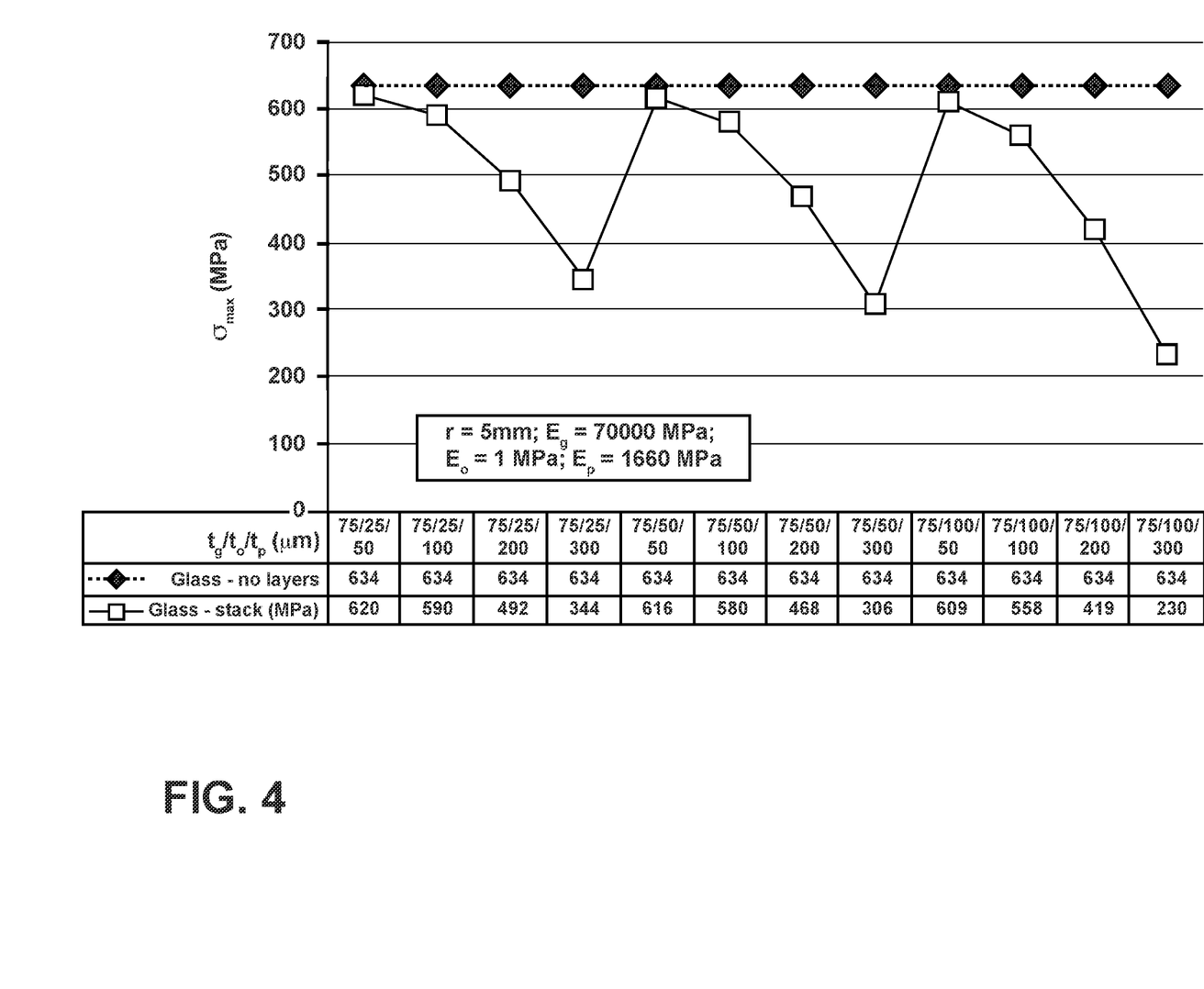
FIG. 4 is a schematic of the maximum tensile stress apparent at a primary surface of the glass element or layer with and without the addition of an OCA and PET layer according to an aspect of the disclosure.

Referring to FIG. 4, a schematic is provided of the maximum tensile stress apparent at the primary surface 206*a* of the glass element or layer 200 of a stack assembly 300 with and without the addition of OCA and PET layers according to an aspect of the disclosure. The results depicted in FIG. 4 were modeled by Equations (3) and (4) above. In this assessment, the stack assembly 300 was assumed to possess a glass layer 200 having an elastic modulus of 70 GPa; a sub-layer 220 comprising an OCA with an elastic modulus of 1 MPa; and a sub-layer 240 comprising a PET material with an elastic modulus of 1660 MPa. A bend radius of 5 mm was applied to the stack assembly 300 and the plate distance, D, was assumed to be 10 mm. Further, the thickness of the glass layer 200 ($t_g$) was held constant at 75 μm and the thicknesses the sub-layers 220 and 240 ($t_o$ and $t_p$) were varied from 25 to 100 μm and from 50 to 300 μm, respectively. As a comparison point, maximum stress values were also plotted in FIG. 4 for a stack assembly 300 lacking any second layer or sub-layers.

Still referring to FIG. 4, the maximum estimated tensile stress for the stack assembly 300 lacking any additional layers was 634 MPa. In comparison, the maximum estimated tensile stress for the stack assemblies 300 with lower elastic moduli sub-layers in addition to the glass layer ranged from 230 to 620 MPa. Clearly, increasing the thickness of the OCA and PET sub-layers can reduce the estimated maximum tensile stress observed in the glass layer 200. It is also evident that increasing the thickness of the PET layer is more effective at reducing the magnitude of the maximum tensile stress at the surface 206*a* of the glass layer 200.

Figure 5:
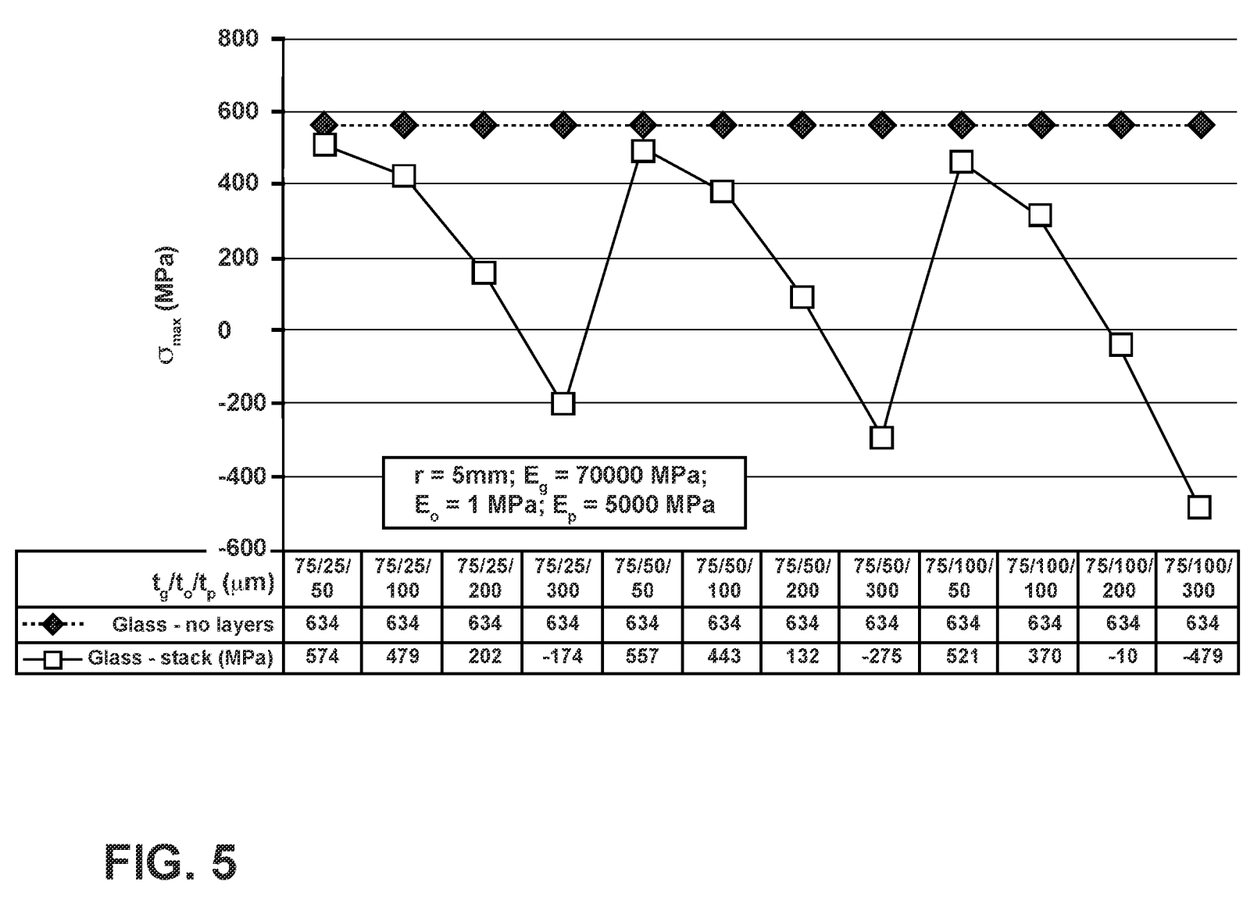
FIG. 5 is a schematic of the maximum tensile stress apparent at a primary surface of the glass element or layer with and without the addition of an OCA and PET layer according to an additional aspect of the disclosure.

Referring to FIG. 5, a schematic is provided of the maximum tensile stress apparent at the primary surface 206*a* of the glass element or layer 200 of a stack assembly 300 with and without the addition of OCA and PET layers according to a further aspect of the disclosure. The results depicted in FIG. 5 were also modeled by using Equations (3) and (4) above. In this assessment, the stack assembly 300 was assumed to possess a glass layer 200 having an elastic modulus of 70 GPa; a sub-layer 220 comprising an OCA with an elastic modulus of 1 MPa; and a sub-layer 240 comprising a PET material with an elastic modulus of 5000 MPa. A bend radius of 5 mm was applied to the stack assembly 300 and the plate distance, D, was assumed to be 10 mm. Further, the thickness of the glass layer 200 ($t_g$) was held constant at 75 µm and the thicknesses the sub-layers 220 and 240 ($t_o$ and $t_p$) were varied from 25 to 100 µm and from 50 to 300 µm, respectively. As a comparison point, maximum stress values were also plotted in FIG. 5 for a stack assembly 300 lacking any second layer or sub-layers.

In comparing FIGS. 4 and 5, the primary difference between the modeled stack assemblies 300 is the elastic modulus of the PET sub-layer 240. In FIG. 5, the stack assembly 300 possesses a PET sub-layer 240 having a significantly higher elastic modulus of 5000 MPa (i.e., as compared to 1660 MPa for the sub-layer 240 in the stack assembly 300 modeled in FIG. 4). Still referring to FIG. 5, the maximum estimated tensile stress for the stack assembly 300 lacking any additional layers was 634 MPa. In comparison, the maximum estimated tensile stress for the stack assemblies 300 with lower elastic moduli sub-layers in addition to the glass layer ranged from −479 to +574 MPa. Clearly, increasing the modulus of the PET sub-layer can reduce the estimated maximum tensile stress observed in the glass layer 200 at the second primary surface 206a. In some conditions, the maximum estimated stress observed at the second primary surface 206a is negative, indicative of compressive stress and a glass with high mechanical reliability. Likewise, such stack assemblies 300 with compressive stresses observed at the primary surface 206a of the glass layer 200 could be suitable for many flexible electronic device applications without requiring the development or imposition of an additional compressive stress region (e.g., through chemical ion exchange processes, as outlined in the Bendable Glass Applications).

Figure 6:
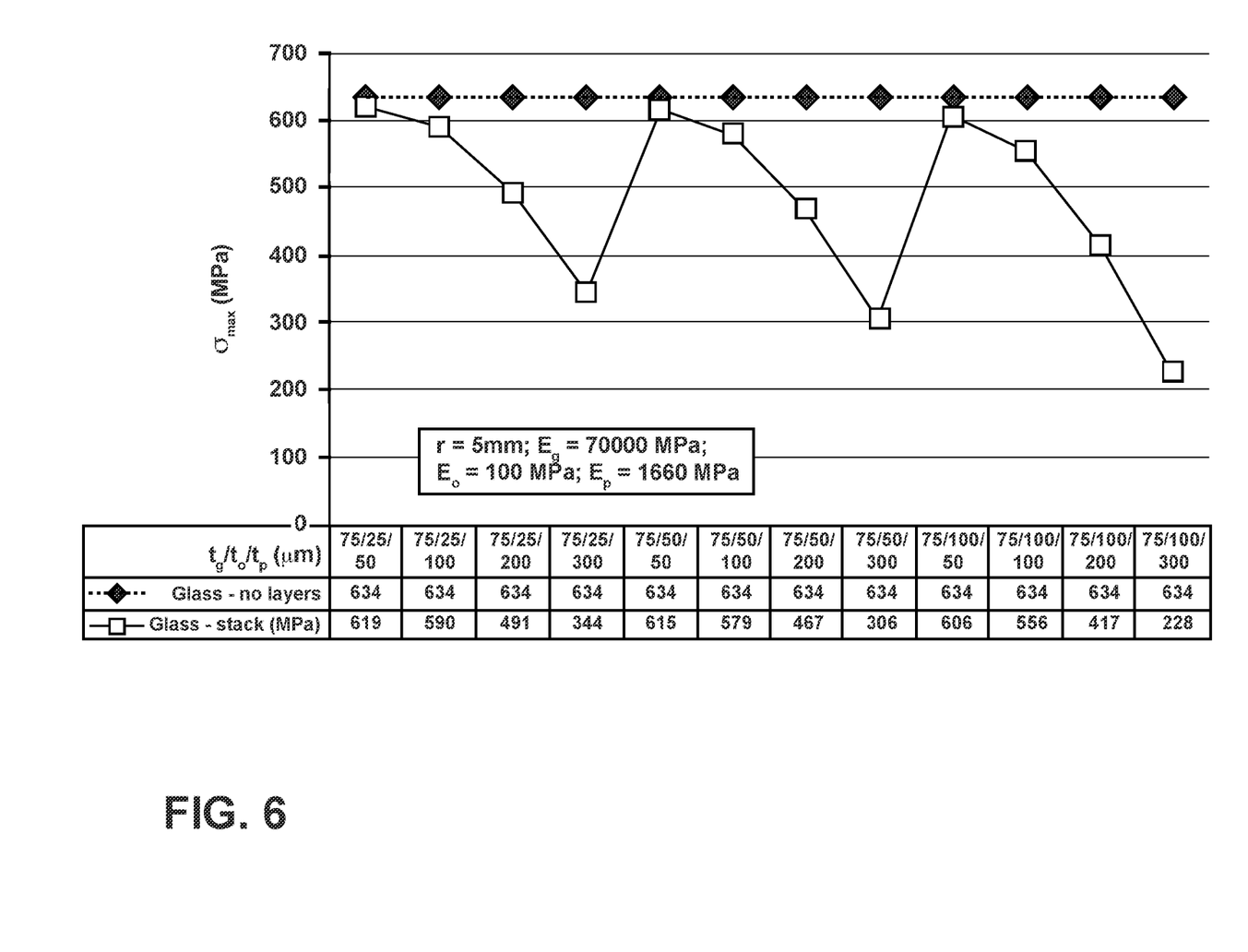
FIG. 6 is a schematic of the maximum tensile stress apparent at a primary surface of the glass element or layer with and without the addition of an OCA and PET layer according to another aspect of the disclosure.

Referring to FIG. 6, a schematic is provided of the maximum tensile stress apparent at the primary surface 206a of the glass element or layer 200 of a stack assembly 300 with and without the addition of OCA and PET layers according to a further aspect of the disclosure. The results depicted in FIG. 6 were likewise modeled by using Equations (3) and (4) above. In this assessment, the stack assembly 300 was assumed to possess a glass layer 200 having an elastic modulus of 70 GPa; a sub-layer 220 comprising an OCA with an elastic modulus of 100 MPa; and a sub-layer 240 comprising a PET material with an elastic modulus of 1660 MPa. A bend radius of 5 mm was applied to the stack assembly 300 and the plate distance, D, was assumed to be 10 mm. Further, the thickness of the glass layer 200 ($t_g$) was held constant at 75 µm and the thicknesses the sub-layers 220 and 240 ($t_o$ and $t_p$) were varied from 25 to 100 µm and from 50 to 300 µm, respectively. As a comparison point, maximum stress values were also plotted in FIG. 6 for a stack assembly 300 lacking any second layer or sub-layers.

In comparing FIGS. 4 and 6, the primary difference between the modeled stack assemblies 300 is the elastic modulus of the OCA sub-layer 220. In FIG. 6, the stack assembly 300 possesses an OCA sub-layer 220 having a significantly higher elastic modulus of 100 MPa (i.e., as compared to 1 MPa for the sub-layer 220 in the stack assembly 300 modeled in FIG. 4). Still referring to FIG. 6, the maximum estimated tensile stress for the stack assembly 300 lacking any additional layers was 634 MPa. As shown here, however, increasing the modulus of the OCA sub-layer 220 provides a less-significant reduction of a few MPa to the estimated maximum tensile stress at the primary surface 206a of the glass layer 200.

It should be understood that the results and modeling depicted in FIGS. 4-6 are exemplary of stacking optimization methodologies for developing bendable glass stack assemblies (e.g., stack assemblies 300) according to aspects of the disclosure. Equations (3) and (4) can be used to optimize the neutral axis location of these bendable glass stack assemblies, including stack assemblies 300, to minimize, or in some implementations eliminate, the tensile stresses observed at a primary surface of the glass layer associated with application-oriented bending configurations.

Figure 7:
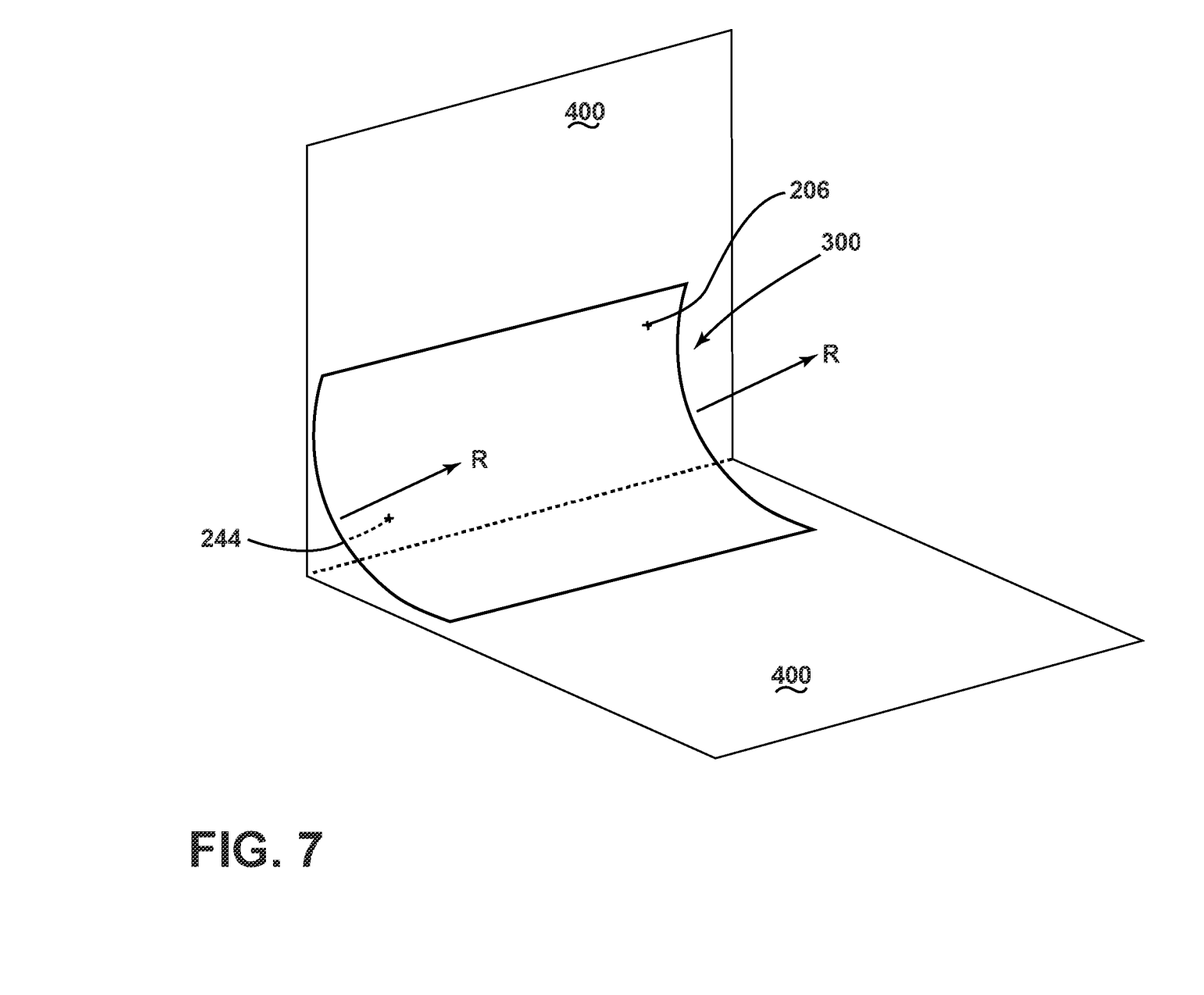
FIG. 7 is a schematic of a flexible backsplash employing a stack assembly according to a further aspect of the disclosure.

Referring to FIG. 7, a stack assembly 300 is depicted as employed within a flexible backsplash application according to a further aspect of the disclosure. As is evident from FIG. 7, the stack assembly 300 is subjected to an upward bending between walls 400 such that its first primary surface 206 is in compression (e.g., concave-shaped) and the primary surface 244 of the second layer 260 is in tension, as may be the second primary surface 206a of the glass layer 200 (not shown). That is, the glass layer 200 within the stack assembly 300 will face outward, thus providing easy-to-clean, scratch-resistant and puncture-resistant characteristics.

According to a further aspect of the disclosure, a method of making a stack assembly 300 includes the steps: forming a first glass layer (e.g., glass layer 200) having a first and a second primary surface (e.g., primary surfaces 206 and 206a, respectively), a compressive stress region extending from the second primary surface of the glass layer to a first depth in the glass layer, and a final thickness (e.g., thickness 262), wherein the region is defined by a compressive stress of at least about 100 MPa at the second primary surface of the layer. The method also includes the step of forming a second layer (e.g., second layer 260) with a second thickness (e.g., thickness 262) that is coupled to the second primary surface of the first glass layer. In some embodiments, the second layer has an elastic modulus that is lower than the elastic modulus of the glass layer. The method also includes a step for forming a glass element (e.g., glass element or layer 200) having a thickness from about 25 µm to about 125 µm, the element further comprising a first and a second primary surface, and the first glass layer. The glass element or layer formed by such a method is characterized by: (a) an absence of failure when the element is held at a bend radius from about 3 mm to about 20 mm for at least 60 minutes at about 25° C. and about 50% relative humidity, (b) a puncture resistance of greater than about 1.5 kgf when the second primary surface of the element is supported by (i) an approximately 25 µm thick pressure-sensitive adhesive having an elastic modulus of less than about 1 GPa and (ii) an approximately 50 µm thick polyethylene terephthalate layer having an elastic modulus of less than about 10 GPa, and the first primary surface of the element is loaded with a stainless steel pin having a flat bottom with a 200 µm diameter, (c) a pencil hardness of greater than or equal to 8H, and (d) a neutral axis within the glass layer or element that is located between the second primary surface and half of the first thickness.

In some embodiments of the method, the step of forming the first glass layer can comprise a forming process selected from the group consisting of fusion, slot drawing, rolling, redrawing and float processes, the forming process further configured to form the glass layer to the final thickness. Other forming processes can be employed depending on the final shape factor for the glass layer and/or intermediate dimensions of a glass precursor used for the final glass layer. The forming process can also include a material removal process configured to remove material from the glass layer to reach the final thickness.

According to some aspects of the method, the step of forming a compressive stress region extending from the second primary surface of the glass layer (e.g., second primary surface 206a) to a first depth in the glass layer comprises: providing a strengthening bath comprising a plurality of ion-exchanging metal ions having an atomic radius larger in size than the atomic radius of a plurality ion-exchangeable metal ions contained in the glass layer; and submersing the glass layer in the strengthening bath to exchange a portion of the plurality of ion-exchangeable metal ions in the glass layer with a portion of the plurality of the ion-exchanging metal ions in the strengthening bath to form a compressive stress region extending from the second primary surface to the first depth in the glass layer. In certain cases, the submersing step comprises submersing the glass layer in the strengthening bath at about 400° C. to about 450° C. for about 15 minutes to about 180 minutes.

In certain embodiments, the method can also include a step of removing about 1 μm to about 5 μm from the final thickness of the glass layer (e.g., thickness 262) at the second primary surface (e.g., second primary surface 206a) after the compressive stress region is created. The removing step can be conducted such that the compressive stress region comprises a maximum flaw size of 5 μm or less at the second primary surface of the glass layer. The removing step can also be conducted such that the compressive stress region comprises a maximum flaw size of 2.5 μm or less, or even as low as 0.4 μm or less, at the second primary surface of the glass layer.

In some implementations, the foregoing method can include a step of optimizing the thicknesses and elastic moduli of the glass layer (e.g., glass layer or element 200) and the second layer (e.g., second layer 260) to shift the neutral axis (e.g., neutral axis 500) of the stack assembly toward the second primary surface of the glass layer—i.e., toward a primary surface opposite from the display-side of the stack assembly.

It will be apparent to those skilled in the art that various modifications and variations can be made without departing from the spirit or scope of the claims. In particular, the foregoing disclosure presents stacking-optimized, bendable glass assemblies with a foldable device application outlined for purposes of explicating the various aspects and details of such assemblies and methods for creating them. It should be understood, however, that these glass assemblies and associated methods can also be employed in other flexible device applications where bending forces are applied in different directions and angles relative to those contemplated by the foregoing foldable device application. For example, it is contemplated that such stacking-optimized assemblies can be employed in situations where their first primary surfaces are placed in tension by the application in question. The principles of the foregoing can be applied to such stacking-optimized assemblies to move the neutral axis toward their first primary surfaces to reduce the magnitude of the tensile stresses observed at these locations, for example, by coupling an additional layer or layers (in some embodiments having a lower elastic modulus than the elastic modulus of the glass layer) to such surfaces with optimized elastic moduli and/or thicknesses.

What is claimed is:

1. A stack assembly, comprising:
a glass element having a first thickness from about 25 μm to about 125 μm, and a first and a second primary surface, the glass element further comprising:
(a) a first glass layer having a first and second primary surface, and
(b) a compressive stress region extending from the second primary surface of the glass layer to a first depth in the glass layer, the region defined by a compressive stress of at least about 100 MPa at the second primary surface of the layer, the compressive stress region comprises a maximum flaw size of 5 μm or less; and
a second layer coupled to the second primary surface of the glass layer having a second thickness, wherein the second layer comprises a composite of polymer and optically clear adhesive (OCA), the polymer of the second layer comprises at least one of polyethylene terephthalate (PET) or polymethyl methacrylate (PMMA), the OCA coupled to the second primary surface of the glass layer, and wherein the thicknesses and elastic moduli of the polymer, the OCA and the glass layer are configured to shift the neutral axis, compared to a position of the neutral axis of the glass layer when not coupled to the second layer, toward the second primary surface of the glass layer when the stack assembly is bent so that the center of curvature is on the side of the first primary surface,
wherein the glass element is characterized by:
(a) an absence of failure when the element is held at a bend radius from about 3 mm to about 10 mm for at least 60 minutes at about 25° C. and about 50% relative humidity,
(b) a puncture resistance of greater than about 1.5 kgf when the second primary surface of the element is supported by (i) an approximately 25 μm thick pressure-sensitive adhesive having an elastic modulus of less than about 1 GPa and (ii) an approximately 50 μm thick polyethylene terephthalate layer having an elastic modulus of less than about 10 GPa, and the first primary surface of the element is loaded with a stainless steel pin having a flat bottom with a 200 μm diameter,
(c) a pencil hardness of greater than or equal to 8H, and
(d) a neutral axis within the glass layer that is located between the second primary surface and half of the first thickness, when the stack assembly is in the bent configuration.

2. The assembly of claim 1, wherein the compressive stress at the second primary surface of the glass layer is from about 300 MPa to 1000 MPa.

3. The assembly of claim 1, wherein the first depth is set at approximately one third of the thickness of the glass layer or less from the second primary surface of the glass layer.

4. The assembly of claim 1, wherein the glass layer further comprises an edge, and the glass element further comprises an edge compressive stress region extending from the edge to an edge depth in the glass layer, the edge compressive stress region defined by a compressive stress of at least about 100 MPa at the edge.

5. The assembly of claim 1, wherein the polymer of the second layer consists of polyethylene terephthalate (PET).

6. The assembly of claim 1, wherein the polymer of the second layer consists of polymethyl methacrylate (PMMA).

7. The assembly of claim 1, wherein the second layer has an elastic modulus that is lower than the elastic modulus of the glass layer.

8. A method of making a stack assembly, comprising the steps:
forming a first glass layer having a first and a second primary surface, a compressive stress region extending from the second primary surface of the glass layer to a first depth in the glass layer, and a final thickness, wherein the region is defined by a compressive stress of at least about 100 MPa at the second primary surface of the layer, the compressive stress region comprises a maximum flaw size of 5 μm or less;
forming a second layer with a second thickness that is coupled to the second primary surface of the first glass layer wherein the second layer comprises a composite of polymer and optically clear adhesive (OCA), the polymer of the second layer comprises at least one of polyethylene terephthalate (PET) or polymethyl methacrylate (PMMA), the OCA coupled to the second primary surface of the glass layer, and wherein the thicknesses and elastic moduli of the polymer, the OCA and the glass layer are configured to shift the neutral axis, compared to a position of the neutral axis of the glass layer prior to coupling, toward the second primary surface of the glass layer when the stack assembly is bent so that the center of curvature is on the side of the first primary surface; and
forming a glass element having a thickness from about 25 μm to about 125 μm, the element further comprising a first and a second primary surface, and the first glass layer,
wherein the glass element is characterized by:
(a) an absence of failure when the element is held at a bend radius from about 3 mm to about 10 mm for at least 60 minutes at about 25° C. and about 50% relative humidity,
(b) a puncture resistance of greater than about 1.5 kgf when the second primary surface of the element is supported by (i) an approximately 25 μm thick pressure-sensitive adhesive having an elastic modulus of less than about 1 GPa and (ii) an approximately 50 μm thick polyethylene terephthalate layer having an elastic modulus of less than about 10 GPa, and the first primary surface of the element is loaded with a stainless steel pin having a flat bottom with a 200 μm diameter,
(c) a pencil hardness of greater than or equal to 8H, and
(d) a neutral axis within the glass layer that is located between the second primary surface and half of the first thickness, when the stack assembly is in the bent configuration.

9. The method of claim 8, wherein the second layer has an elastic modulus that is lower than the elastic modulus of the glass layer.

10. The stack assembly of claim 1, wherein the compressive stress region comprises a maximum flaw size of 2.5 μm or less.

11. The method of claim 8, further comprising removing about 1 μm to about 5 μm from the final thickness of the glass layer at the second primary surface after the compressive stress region is created, wherein the compressive stress region comprises a maximum flaw size of 2.5 μm or less.

12. The stack assembly of claim 1, wherein the first thickness is from about 50 μm to about 100 μm.

13. The stack assembly of claim 12, wherein the first thickness is from about 60 μm to about 80 μm.

14. The stack assembly of claim 1, further comprising a third layer disposed on the first primary surface of the first glass element.

15. The stack assembly of claim 14, wherein the third layer comprises an amorphous fluorocarbons.

16. The stack assembly of claim 1, wherein the polymer comprises a thickness from 50 μm to 300 μm.

17. The stack assembly of claim 1, wherein the OCA comprises a thickness from 25 μm to 100 μm.

18. The stack assembly of claim 10, wherein the maximum flaw size is about 0.4 μm or less.

* * * * *